(No Model.)
E. Y. MOORE.
WHEEL FOR DOOR HANGERS.
No. 515,406. Patented Feb. 27, 1894.
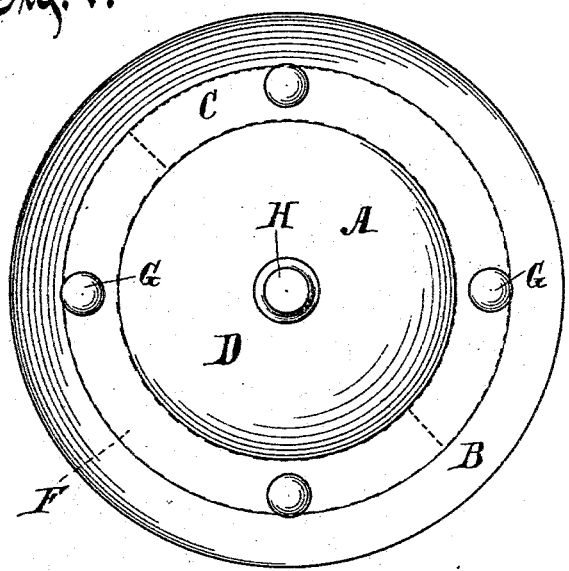
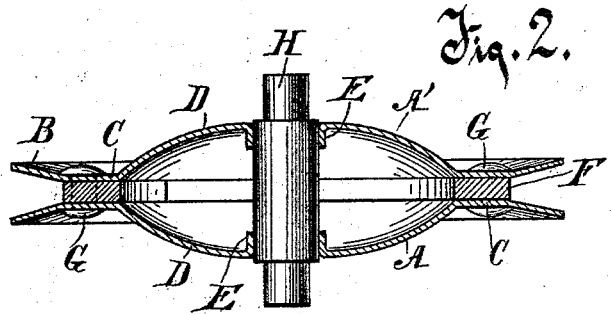
Witnesses.
Inventor.
Edward Y. Moore
By Benedict Morsell
Attorneys.

UNITED STATES PATENT OFFICE.

EDWARD Y. MOORE, OF MILWAUKEE, WISCONSIN.

WHEEL FOR DOOR-HANGERS.

SPECIFICATION forming part of Letters Patent No. 515,406, dated February 27, 1894.

Application filed September 14, 1893. Serial No. 485,444. (No model.)

*To all whom it may concern:*

Be it known that I, EDWARD Y. MOORE, of Milwaukee, in the county of Milwaukee and State of Wisconsin, have invented a new and useful Improvement in Wheels for Door-Hangers, of which the following is a description, reference being had to the accompanying drawings, which are a part of this specification.

My invention relates to a wheel adapted for use in a door hanger of the class that is used for supporting and carrying a laterally traveling door on its track.

The object of the invention is to provide a wheel that is light in weight, that is strong and enduring in its character, and is inexpensive of construction.

The invention consists of the improved wheel and its parts as herein described and claimed, or their equivalents.

Figure 1, is a side elevation of my improved wheel. Fig. 2, is a transverse section of the wheel centrally thereof.

The plate sides of the wheel or principal part of its structure, are cut from sheet steel, preferably of one-sixteenth of an inch in thickness. These side plates A A' are cut from the sheet of steel in circular form and are swaged to the shape required, being duplicates of each other, and when made up in the wheel are in reverse positions and opposite to each other. The plates each consist of the outwardly flaring annular part B adjacent to the periphery, the flat annular part C, the plane of which is at a right angle to the axis of the wheel, the thereto adjacent but interior laterally curved part D and the inwardly turned annular flange E. An annular member or felly F preferably constructed in segmental or semicircular parts is interposed between the sides of the wheel opposite the flat parts C C and is secured in place, and the wheel is bound together by the rivets G G. This felly is constructed of sheet steel of suitable thickness being cut therefrom in the required form. The felly is substantially as wide radially as the radial extent of the flat annular part C, against the inner surface of which it fits and bears. The felly is cut in segments or semicircular parts so as thereby to more advantageously utilize the sheet metal and thus minimize the cost of construction of the wheel. The outer edge of this felly forms the tread of the wheel, and as the felly is of considerable thickness radially the wheel is much more enduring, than those wheels in which the tread is formed by a shoulder formed in the sheet metal sides, and which are valueless as soon as the comparatively thin tread is worn through. The annular flaring parts B serve as flanges, adapted to bear against the track at its sides, and retain the wheel thereon as it travels on the track. The inwardly turned annular flanges E form an integral hub adapted to receive therein the axle H. The axle may be fitted tightly and thereby fixed in the hub or flanges or may be fitted loosely therein as desired. The latter or loose form of construction is desirable where the wheel is used in a door hanger of the class described in Patent No. 394,873, issued to me on December 18, 1888. The form of the parts D of the sides of the wheel, in that they curve outwardly laterally toward the axis, is such as to give great strength to the wheel against lateral thrust on the tread or against the flanges B, while the smooth outer surface of these parts near the axle furnish a smooth and suitable bearing of considerable extent for the side thrust of the wheel against the frame or bars of the hanger. Also the turning of the annular flanges E inwardly obviates the presenting of the extremity or edge of the flange toward the frame or bars of the hanger, as would occur if the flanges were turned outwardly instead of inwardly.

What I claim as my invention, and desire to secure by Letters Patent of the United States, is—

In a hanger wheel, duplicate sheet metal side plates oppositely disposed and secured to each other rigidly in reverse positions, and a hub integral with the side plates formed of annular flanges turned inwardly from the side plates and adapted to receive the bearing of an axle therein, substantially as described.

In testimony whereof I affix my signature in presence of two witnesses.

EDWARD Y. MOORE.

Witnesses:
CHAS. F. GAFFNEY,
RICHARD W. LUNDY.